US007308972B2

(12) United States Patent
Pax et al.

(10) Patent No.: US 7,308,972 B2
(45) Date of Patent: Dec. 18, 2007

(54) SUSPENDED LOAD CARRIER APPARATUS FOR A FORKLIFT VEHICLE

(75) Inventors: Brian J. Pax, Celina, OH (US); Eric A. Sudhoff, Celina, OH (US); Terry L. Vogel, Celina, OH (US)

(73) Assignee: Pax Machine Works, Inc., Celina, OH (US)

( * ) Notice: Subject to any disclaimer, the term of this patent is extended or adjusted under 35 U.S.C. 154(b) by 0 days.

(21) Appl. No.: 11/209,941

(22) Filed: Aug. 23, 2005

(65) Prior Publication Data

US 2007/0065266 A1 Mar. 22, 2007

(51) Int. Cl.
*B66F 9/12* (2006.01)
*B65G 9/18* (2006.01)

(52) U.S. Cl. ...................... 187/237; 187/222; 414/607; 414/685; 414/666

(58) Field of Classification Search ................ 187/222; 414/607, 685
See application file for complete search history.

(56) References Cited

U.S. PATENT DOCUMENTS 3,264,026 A * 8/1966 Hansen .......................... 294/2
3,319,815 A * 5/1967 Vik ............................ 414/607
3,527,434 A * 9/1970 Mauro ......................... 248/166
3,850,322 A * 11/1974 Miles et al. ................ 414/607
3,954,240 A * 5/1976 Schmidt et al. ............. 248/104
4,073,175 A * 2/1978 Seamon ....................... 72/325
4,124,104 A 11/1978 Yarris
4,128,183 A 12/1978 Finlayson
4,129,223 A 12/1978 Probst
4,381,166 A 4/1983 Smart
4,454,683 A * 6/1984 Schauer et al. ................ 47/76
4,824,317 A 4/1989 Schroder
5,362,078 A * 11/1994 Paton ...................... 280/47.18
5,582,502 A * 12/1996 Herin ......................... 414/685
5,642,979 A * 7/1997 Cullen et al. ............... 414/607
5,692,583 A * 12/1997 Reed et al. ................. 187/237
6,200,083 B1 * 3/2001 Hein .......................... 414/607
6,287,073 B1 * 9/2001 Lindgren et al. ........... 414/785
6,601,892 B2 * 8/2003 Scarborough ............ 294/103.1
6,641,357 B2 * 11/2003 Lindgren et al. ........... 414/785
6,881,023 B1 4/2005 Sullivan
6,966,739 B2 * 11/2005 Figiel et al. ................ 414/426

* cited by examiner

*Primary Examiner*—Patrick Mackey
*Assistant Examiner*—Terrell Matthews
(74) *Attorney, Agent, or Firm*—Jacox, Meckstroth & Jenkins

(57) ABSTRACT

A fabricated metal carrier apparatus includes a carrier member having downwardly facing parallel spaced channels for receiving the forwardly projecting parallel forks of a forklift truck or vehicle. The carrier member has a rotatable vertical shaft located between the forks and connected to support a suspended member adapted to be attached to a load to be transported. A locating and locking arm projects rearwardly from the carrier member and engages the forks to prevent sliding movement of the carrier member on the forks. When not in use, the carrier apparatus is supported and stored in a suspended and conveniently viewed elevated position by an A-frame which has a depending hook for engaging the carrier member. The frame permits the forklift vehicle to pick up and lock on the carrier apparatus and return while the vehicle operator remains in his seat.

8 Claims, 3 Drawing Sheets

SUSPENDED LOAD CARRIER APPARATUS FOR A FORKLIFT VEHICLE

BACKGROUND OF THE INVENTION

In the art of forklift trucks or vehicles of the general type, for example, as disclosed in FIG. 1 of U.S. Pat. No. 4,124,104, it is known to move the forwarding projecting forks laterally together and to wrap a chain around the forks for transporting a suspended load with the chain such as a coil of steel or other metal. The chain is extended through the center of the coil for transporting the coil to its destination, for example, to a supply reel for a stamping press. It has been found desirable to provide for rotating the load or coil when it arrives at its destination in order to have proper placement and alignment of the load or coil. It is also desirable to have the suspended load to be located at the designed load center of the forks and to prevent the wrapped around chain from slipping forwardly or rearwardly on the forks. It is also known to have various devices for attaching to the forks of a forklift truck or vehicle, for example, such as the attachments disclosed in U.S. Pat. No. 4,128,183, No. 4,129,223, No. 4,824,317, No. 5,692,583 and No. 6,881,023. Such attachments are used for transporting special types of loads or for securing a load to the forks of the forklift vehicle.

SUMMARY OF THE INVENTION

The present invention is directed to carrier apparatus designed for attachment to the forks of a forklift vehicle for transporting a load in suspension from a first location to a second location. The apparatus provides all of the desirable features mentioned above and is also adapted to be stored in an elevated position so that the operator of a forklift vehicle may conveniently pick up and return the apparatus, preferably while the operator remains in the vehicle. The apparatus of the invention also positions the suspended load at the designed load center of the forks and positively connects to the forks so that the apparatus and load do not shift relative to the forks during movement of the load.

In accordance with one illustrated embodiment of the invention, the apparatus includes a fabricated steel carrier member having downwardly facing parallel spaced channels for receiving the horizontal portions of L-shaped forks, and the carrier member has a rotary support shaft positioned between the forks and receiving a suspended attachment member adapted to be connected to a load. A connector and locating member or arm connects the carrier member to the vertical portions of the forks and positively locks the carrier member and load support shaft at the load center of the forks. The apparatus of the invention may also be stored when not in use at an elevated position within a storage frame having floor engaging legs connected by a cross bar. A releasable hook connection connects the carrier member to the cross bar and provides for removing the apparatus from the storage frame and attaching the apparatus to the frame in response to movement of the forks. This permits the operator of a conventional forklift vehicle to remain in his seat during the pickup and return of the apparatus.

Other features and advantages of the invention will be apparent from the following description, the accompanying drawings and the appended claims.

DESCRIPTION OF THE PREFERRED EMBODIMENT

Figure 1:
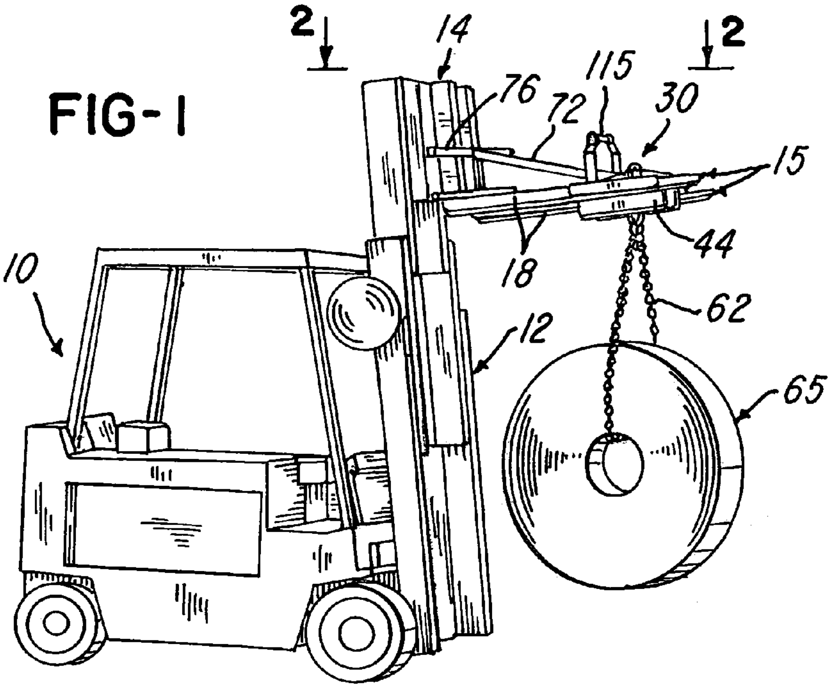
FIG. 1 is a perspective view of a conventional forklift truck or vehicle and having forks supporting carrier apparatus constructed in accordance with the invention for supporting a suspended load.
Figure 2:
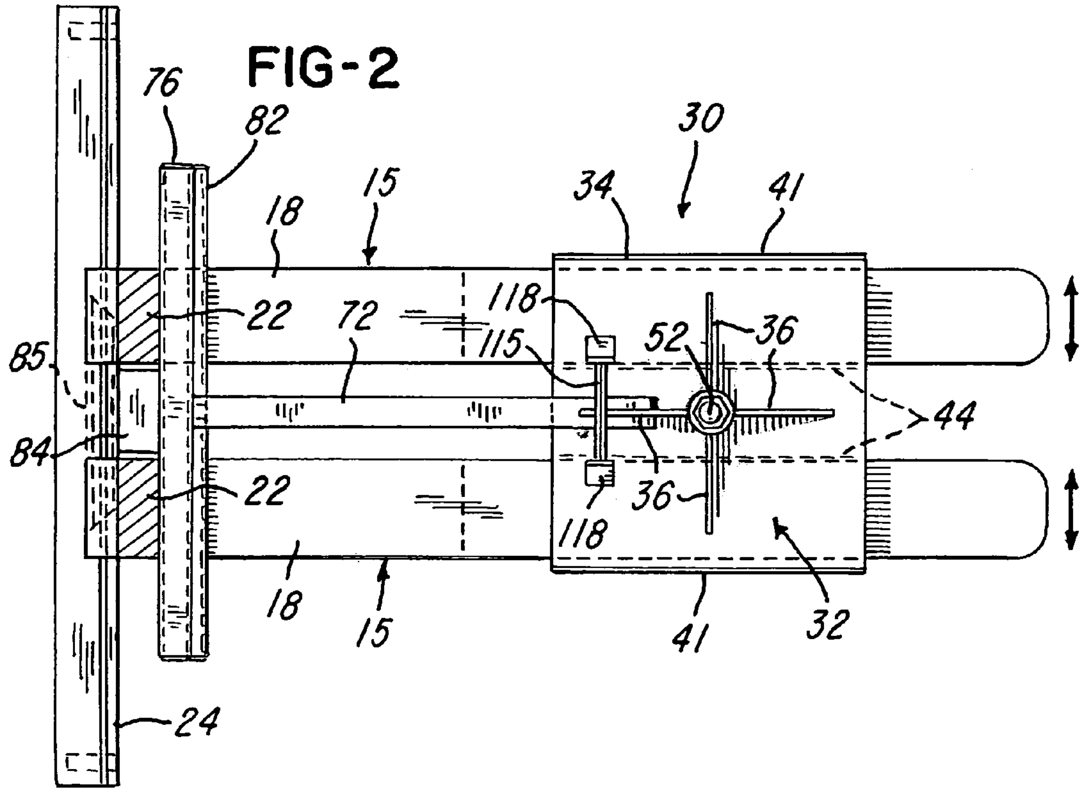
FIG. 2 is an enlarged plan view of the forks and carrier apparatus of the invention, taken generally on the line 2-2 of FIG. 1.

Referring to FIG. 1, a forklift truck or vehicle 10 is illustrated in the form of a riding four wheel lift truck of the general type disclosed in FIG. 1 of above-mentioned U.S. Pat. No. 4,124,104. In general, such a vehicle includes a power operated telescopic mast 12 which is tiltable and supports a power operated vertically movable carriage 14 which supports and carries a pair of L-shaped forks 15 for movement between a lower ground or floor engaging position and an elevated position. However, it is to be understood, as used herein, the term forklift truck or vehicle includes any form of wheel supported vehicle in which an operator rides or walks behind and includes a pair of generally vertically moveable forks. As shown in FIG. 2, each of the L-shaped forks 15 includes a forwardly projecting and generally horizontal leg or portion 18 and an upwardly projecting and generally vertical leg or portion 22. The forks 15 are supported for lateral movement by vertically spaced horizontal support members 24 of the carriage 14. The lateral movement of the forks 15 may be performed manually or by a power operated mechanism or attachment, for example, as disclosed in U.S. Pat. No. 4,381,166.

Figure 3:
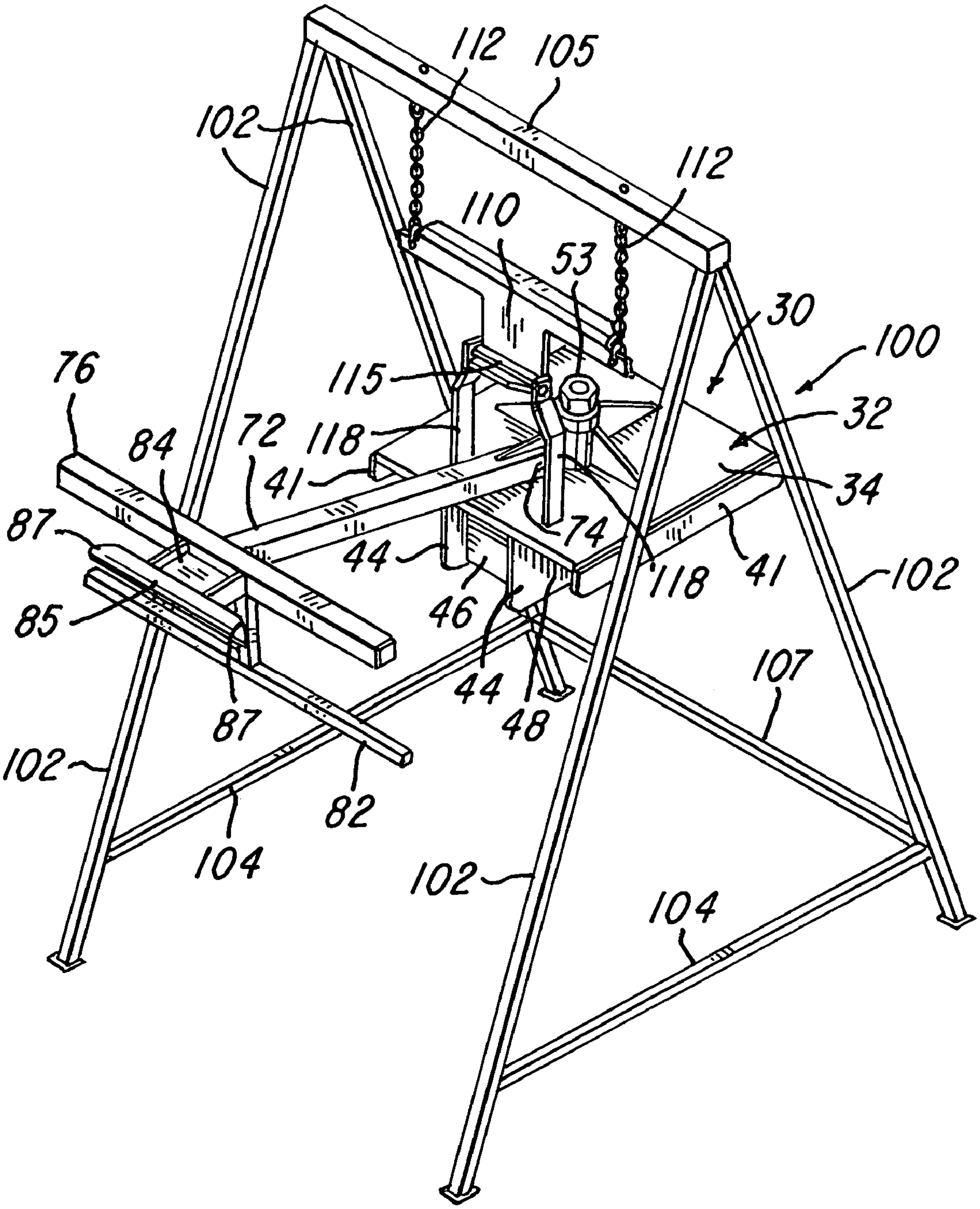
FIG. 3 is a perspective view of the carrier apparatus shown in FIGS. 1 and 2 and being supported in an elevated stored position by a support frame.

In accordance with one embodiment of the present invention, a load supporting carrier apparatus 30 includes a fabricated steel carrier member 32 having a top plate 34 adapted to engage or seat on the forwardly projecting portions 18 of the forks 15. The plate 34 is reinforced by vertical gussett plates 36 welded to the plate 34 and to a tubular center bushing 38. The top plate 34 is formed with downwardly projecting and parallel side flanges 41 (FIG. 3), and parallel spaced vertical plates 44 are welded to the bottom surface of the plate 34 along with parallel spaced vertical cross plates 46 (FIG. 5) connected to the plates 44. The plates 44 cooperate with the outer side flanges 41 to define parallel spaced and downwardly facing channels 48 (FIG. 3) for receiving the horizontal portions 18 of the forks 15. As shown in FIG. 3, the inner plates 44 project downwardly further than the side flanges 41 to facilitate connecting the forks 15 to the carrier apparatus 30, as will be explained later.

Figure 5:
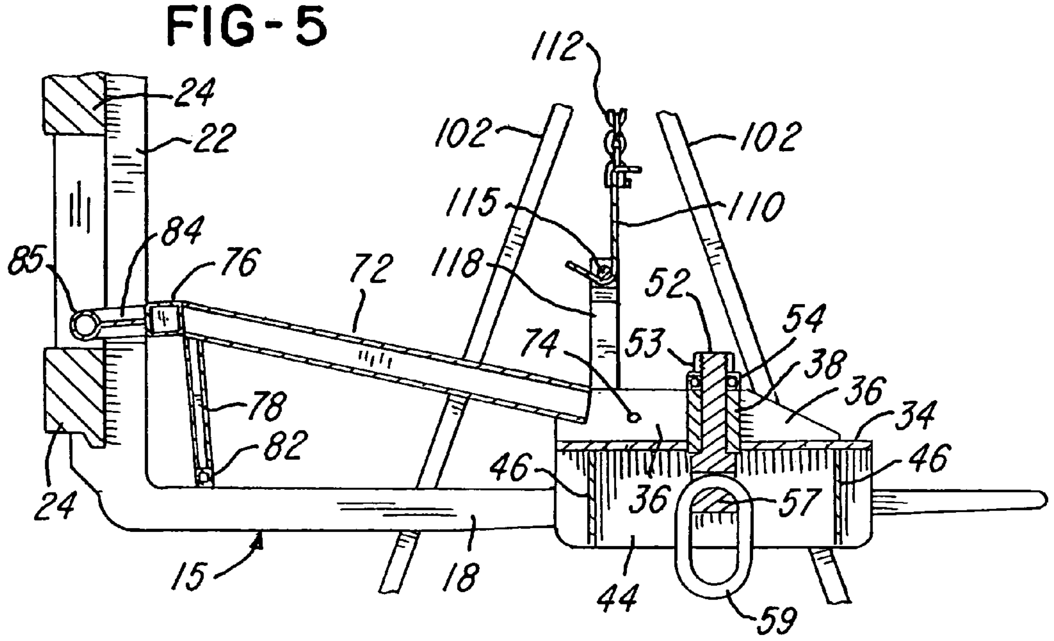
FIG. 5 is a section of the carrier apparatus, taken generally on the line 5-5 of FIG. 4.

Referring to FIG. 5, the vertical tubular bushing 38 supports a shaft 52 for rotation on a vertical axis, and the upper end portion of the shaft 52 receives a threaded nut 53 on top of an anti-friction thrust bearing 54. The shaft 52 has a lower end portion 57 having a cross hole which receives an oval shaped steel link 59. As shown in FIG. 1, the link 59 is adapted to receive a flexible chain 62 for supporting a suspended heavy load as illustrated, for example, in the form of a coil 65 of sheet metal strip. However, it is to be understood that the support member or shaft 52 may also support other forms of depending and suspended support members, for example, in the form of an L-shaped metal rod or one or more metal hooks which are connected to a load and support the load for rotation on the axis of the shaft 52.

The carrier apparatus 30 also includes a connector member or arm 72 constructed of square tubing. The forward end portion of the arm 72 is formed with a slot which receives the rearwardly projecting reinforcing gusset plate 36 and is connected to the plate by a cross pin 74 which provides for tilting movement of the arm 72 in a vertical plane. The rearward end portion of the connecting member or arm 72 is rigidly connected or welded to a horizontal cross member or square tube 76 and also to a downwardly projecting support member or post 78 which is welded to a horizontal cross support member or tube 82 having a length the same as the cross member or tube 76. A rectangular bracket 84 is welded to the center portion of the cross tube 76 and projects rearwardly to support a welded lock member or cross tube 85 having tapered opposite end cam surfaces 87.

Figure 4:
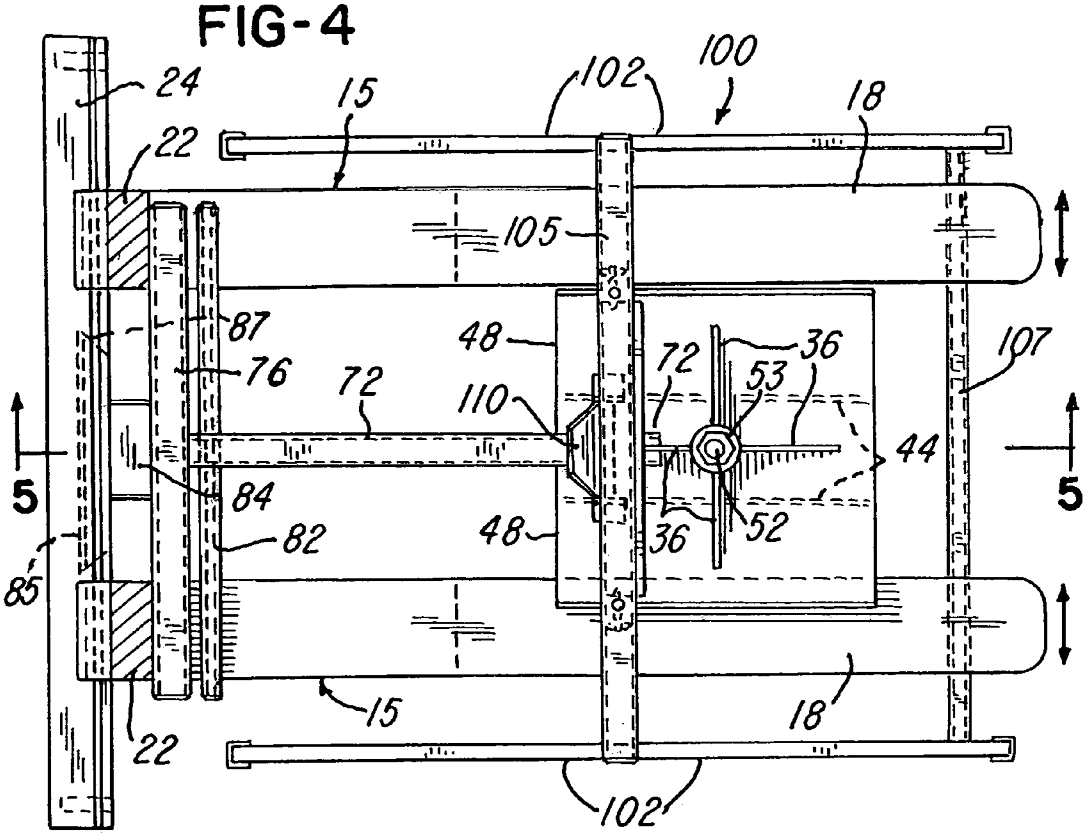
FIG. 4 is a plan view of the forks and carrier apparatus, similar to FIG. 2, and with the spaced forks picking up the carrier apparatus while being supported by the frame shown in FIG. 3.

Referring to FIG. 3, the carrier apparatus 30 may be stored when not in use on a floor or shelf, but preferably is supported in an elevated position to facilitate pickup and return of the apparatus by the forklift truck. As shown in FIGS. 3-5, the carrier apparatus 30 is supported for storage by a support frame 100 which is in the form of a tubular A-frame having two pairs of inclined legs 102 with each pair of legs rigidly connected or welded at the top and rigidly connected near the bottom by a horizontal frame member 104. A horizontal tubular cross member or bar 105 rigidly connects the upper end portions of the pairs of legs 102, and a horizontal lower cross member or tube 107 rigidly connects corresponding inclined legs 102 of each pair of legs. A formed sheet metal hook member 110 (FIGS. 3 & 5) is supported in suspended relation from the cross bar 105 by a pair of flexible chains 112, and the hook member 110 is adapted to engage a horizontal cross rod 115 having opposite end portions rigidly connected or welded to a pair of formed sheet metal support straps or brackets 118 having lower ends welded to the top plate 34 of the carrier member 32. The support rod 115 is located within a vertical plane which extends through the center of gravity of the apparatus 30 so that the carrier member is normally horizontal in storage.

When the forklift truck 10 is positioned to pick up the carrier apparatus 30 for transporting a suspended load, such as the coil 65, the operator of the forklift truck 10 shifts the forks 15 laterally outwardly until the forks are spaced outwardly of the plate 34 and from the ends 87 of the locking member or tube 85. The forks 15 are then elevated until the horizontal legs 18 are close to the bottom of the support tube 82 which is slightly below the side flanges 41 of the plate 34. The forks 15 are then moved forwardly until the cross stop member or tube 76 contacts the vertical portions 22 of the forks 15, and the lock member or tube 85 is located behind the vertical portions 22 of the forks 15. The forks 15 are then shifted laterally inwardly or towards each other, either manually or under power control, until the leg portions 18 of the forks are adjacent or contact the inner vertical plates 44 of the carrier member 32 and the lock tube 85 is behind the vertical portions of the forks 15, as shown in FIG. 2.

The forks 15 are then elevated by the carriage 14 until the leg portions 18 of the forks pick up of the carrier apparatus 30 and raise the cross rod 115 above the hook member 110. When the forks 15 move upwardly, the connector arm 72 pivots upwardly relative to the carrier member 32 as a result of the cross support member 82 engaging the top surfaces of the horizontal fork portions 18. The forklift vehicle 10 is then backed away from the storage support frame 100, and the carrier apparatus 30 is locked to the forks and ready to transport a suspended load. When it is desired to return the carrier apparatus 30 to the support frame 100, the above described steps are simply reversed until the carrier apparatus 30 is suspended from the hook member 110 in its stored position.

From the drawings in the above description, a carrier apparatus constructed in accordance with the invention provides desirable features and advantages. As one feature, the carrier apparatus 30 is positively located on the forwardly projecting portions 18 of the forks 15 and is locked in a position by the arm 72 and lock tube 85 so that the vertical centerline of the carrier member 32 or axis of the shaft 52 is located at the load center of the fork portions 18. The carrier member 32 also provides for rotating the suspended load in order to position the load at the desired location. When lateral movement of the forks is power operated, as is common on many forklift trucks, the carrier apparatus 30 may be picked up and locked onto the forks by the truck operator and returned to its stored position while the operator of the truck remains on the truck or in his seat. This provides for efficiently using the carrier apparatus. In addition, the carrier frame 100 provides for storing the carrier apparatus 30 at an elevation where the seated truck operator can easily see the carrier apparatus for picking up and returning the apparatus.

While the form of carrier apparatus herein described constitutes a preferred embodiment of the invention, it is to be understood that the invention is not limited to this precise form of apparatus, and that changes may be made therein without departing from the scope and spirit of the invention as defined in the appended claims.

What is claimed is:

1. Apparatus in combination with a wheel supported forklift vehicle including a pair of forwardly projecting parallel forks having generally vertical portions, to provide for supporting and transporting a load positioned below said forks, said apparatus comprising a substantially horizontal carrier member removably resting on said forks, said carrier member having parallel spaced and downwardly facing open bottom channels receiving said forks and restraining lateral movement of said carrier member relative to said forks, said open bottom channels providing for separating said carrier member from said forks in response to movement of said forks downwardly from said carrier member, a substantially vertical shaft supported by said carrier member between said forks and for rotation on a substantially vertical axis, a load support member connected to a lower end portion of said shaft and projecting downwardly from said shaft for engaging the load, a connector member connecting said carrier member to said forks and restricting forward and rearward sliding movement of said carrier member on said forks, said connector member including an elongated arm projecting rearwardly from said carrier member, laterally extending elongated horizontal cross members connected to said arm, and said cross members are positioned adjacent both front and rear surfaces of said vertical portions of said forks.

2. Apparatus as defined in claim 1 wherein a first of said cross members adjacent said rear surfaces of said vertical portions of said forks is shorter than a second of said cross member adjacent said front surfaces of said vertical portions of said forks to facilitate locking said arm to said forks in response to laterally inward movement of said forks toward each other.

3. Apparatus as defined in claim 1 wherein a third of said cross members engages top surfaces of said forwardly projecting parallel forks and supports said arm from said forks, and said arm is pivotally connected to said carrier member.

4. Apparatus as defined in claim 1 wherein said load support member comprises a flexible chain connected to said shaft for rotation therewith and projecting downwardly from said shaft.

5. Apparatus as defined in claim 1 wherein said carrier member comprises a horizontal plate having downwardly projecting parallel side flanges, parallel spaced vertical inner plates projecting downwardly from said horizontal plate and cooperating with said side plates to define said open bottom channels, and said vertical inner plates project downwardly below said side flanges to facilitate mounting said carrier member on said forks.

6. Apparatus as defined in claim 1 in combination with a storage frame supporting said apparatus at a predetermined elevation above a floor, said frame having horizontally spaced legs adapted to engage the floor and connected by a horizontal cross bar, and a releasable connection connecting said carrier member to said cross bar and providing for attaching and removing said carrier member to and from said storage frame in response to vertical movement of said forks.

7. Apparatus as defined in claim 6 wherein said storage frame comprises parallel spaced A-shaped frame members each having converging said legs, and said frame members have upper portions connected by said cross bar.

8. Apparatus as defined in claim 6 wherein said releasable connection comprises a hook member disposed below and supported by said cross bar, and said carrier member includes a laterally extending horizontal cross rod releasably engaging said hook member.

* * * * *